(12) United States Patent
Salam et al.

(10) Patent No.: US 9,001,644 B2
(45) Date of Patent: Apr. 7, 2015

(54) ETHERNET VIRTUAL PRIVATE NETWORK SYSTEM FOR PROVIDING FAST PROTECTION FOR ACCESS RINGS

(71) Applicant: Cisco Technology, Inc., San Jose, CA (US)

(72) Inventors: Samer Salam, Vancouver (CA); Ali Sajassi, San Ramon, CA (US); Sami Boutros, San Ramon, CA (US)

(73) Assignee: Cisco Technology, Inc., San Jose, CA (US)

(*) Notice: Subject to any disclaimer, the term of this patent is extended or adjusted under 35 U.S.C. 154(b) by 242 days.

(21) Appl. No.: 13/769,474

(22) Filed: Feb. 18, 2013

(65) Prior Publication Data

US 2014/0233369 A1    Aug. 21, 2014

(51) Int. Cl.
  *H04L 12/26*  (2006.01)
  *H04L 12/24*  (2006.01)
  *H04L 12/437*  (2006.01)

(52) U.S. Cl.
  CPC ........ *H04L 41/0677* (2013.01); *H04L 41/0659* (2013.01); *H04L 12/437* (2013.01)

(58) Field of Classification Search
  None
  See application file for complete search history.

(56) References Cited

U.S. PATENT DOCUMENTS

| | | | |
|---|---|---|---|
| 6,973,028 B1 * | 12/2005 | Huai et al. ................... 370/222 | |
| 7,370,119 B2 | 5/2008 | Provine et al. | |
| 7,983,150 B2 | 7/2011 | Bruckman et al. | |
| 7,983,153 B2 | 7/2011 | Filsfils et al. | |
| 2006/0098660 A1 * | 5/2006 | Pal et al. ................... 370/395.51 |
| 2007/0057782 A1 * | 3/2007 | Wimmer ....................... 340/531 |
| 2008/0037526 A1 * | 2/2008 | Dong ........................... 370/352 |
| 2010/0088440 A1 * | 4/2010 | Banks et al. .................. 710/109 |
| 2010/0287405 A1 * | 11/2010 | Soon ............................... 714/4 |
| 2010/0315946 A1 * | 12/2010 | Salam et al. .................. 370/222 |
| 2011/0164493 A1 * | 7/2011 | Bragg ........................... 370/217 |
| 2011/0292789 A1 * | 12/2011 | Long et al. .................... 370/222 |
| 2012/0106360 A1 * | 5/2012 | Sajassi et al. ................. 370/245 |
| 2012/0155484 A1 * | 6/2012 | Sergeev et al. ............... 370/405 |
| 2012/0250695 A1 * | 10/2012 | Jia et al. ....................... 370/400 |
| 2012/0314565 A1 * | 12/2012 | Ding et al. .................... 370/223 |
| 2013/0021901 A1 * | 1/2013 | Ding et al. .................... 370/225 |
| 2013/0259067 A1 * | 10/2013 | Agmon ......................... 370/468 |
| 2014/0029443 A1 * | 1/2014 | Bhavanam et al. ........... 370/244 |
| 2014/0301186 A1 * | 10/2014 | Zhang et al. .................. 370/228 |
| 2014/0317248 A1 * | 10/2014 | Holness et al. ............... 709/221 |
| 2014/0328160 A1 * | 11/2014 | Zhou et al. .................... 370/218 |

* cited by examiner

*Primary Examiner* — Otis L Thompson, Jr.
(74) *Attorney, Agent, or Firm* — P. Su

(57) ABSTRACT

In one embodiment, a method includes obtaining a first indication from a first source included in an Ethernet ring and obtaining a second indication from a second source associated with a provider edge (PE) node The method also includes determining when the first indication and the second indication are indicative of a direct failure of the PE node and determining when the first indication and the second indication are indicative of a ring partition failure associated with the Ethernet ring. The direct failure of the PE node is identified when it is determined that the first indication and the second indication are indicative of the direct failure of the PE node, and the ring partition failure associated with the Ethernet ring is identified when it is determined that the first indication and the second indication are indicative of the ring partition failure associated with the Ethernet ring.

22 Claims, 9 Drawing Sheets

ETHERNET VIRTUAL PRIVATE NETWORK SYSTEM FOR PROVIDING FAST PROTECTION FOR ACCESS RINGS

TECHNICAL FIELD

The disclosure relates generally to network based services. More particularly, the disclosure relates to efficiently distinguishing between provider edge link or port failures and split ring failures within an Ethernet Virtual Private Network (E-VPN) that includes G.8032 rings.

BACKGROUND

Ethernet Virtual Private Network (E-VPN) is a layer 2 virtual private network (VPN) technology, and is based on Multiprotocol Label Switching (MPLS). In general, an E-VPN network includes customer edge nodes (CEs) such as hosts, routers, and/or switches that form the edge of a customer system connected to an MPLS infrastructure.

Ethernet Ring Protection Switching (ERPS) is an Ethernet ring protection protocol for Ethernet layer network rings or, more generally, for Ethernet Segments (ESs) that are rings. Ethernet rings are often used to provide dual-homed connectivity for an access network to pairs of layer 2 VPN (L2VPN) provider edges. ITU-T G.8032 is an Ethernet ring protection protocol that allows a fail-over to be efficiently provided in the event of a single link, port, or node failure.

Two types of failures may generally occur when an Ethernet Segment is a ring. These two types of failures include provider edge (PE) direct failures and ring partition failures. A PE direct failure includes a PE node failure and failures of a PE attachment circuit. When a PE direct failure occurs, E-VPN Border Gateway Protocol (BGP) prefix-independent convergence (PIC) functionality enables a backup PE node to forward traffic on a ring. A ring partition failure involves failures of elements that are internal to a ring. When a ring partition failure occurs, E-VPN BGP PIC functionality does not enable a backup PE node to forward traffic, as PEs are unable to identify reachable media access control (MAC) addresses behind the PEs. In general E-VPN BGP PIC may effectively prevent a backup node from withdrawing its Ethernet A-D route.

Within a G.8032 protocol, there is no mechanism for differentiating between PE direct failures and ring partitions. Thus, failures are generally not handled in an efficient manner, as proper protection actions for each type of failure are not triggered efficiently.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining a first indication from a first source included in an Ethernet ring and obtaining a second indication from a second source associated with a provider edge (PE) node The method also includes processing the first indication and the second indication, wherein processing the first indication and the second indication includes determining when the first indication and the second indication are indicative of a direct failure of the PE node and determining when the first indication and the second indication are indicative of a ring partition failure associated with the Ethernet ring. The direct failure of the PE node is identified when it is determined that the first indication and the second indication are indicative of the direct failure of the PE node, and the ring partition failure associated with the Ethernet ring is identified when it is determined that the first indication and the second indication are indicative of the ring partition failure associated with the Ethernet ring.

Description

ITU-T G.8032 defines an Ethernet Ring Protection switching protocol that supports open rings without a virtual-channel, as will be appreciated by those skilled in the art. ITU-T G.8032 does not provide any mechanisms to distinguish failures involving provider edge (PE) nodes and failures involving rings such as G.8032 open rings. In other words, ITU-T G.8032 does not provide the ability to differentiate between failures associated with a PE or a PE attachment circuit, and failures associated with a ring span that causes a ring to be segmented or split.

The ability to differentiate between failures associated with a PE or a PE attachment circuit, e.g., PE failures, and failures associated with a ring span, e.g., ring partition or split ring failures, allows for a proper protection action to be efficiently triggered based on the nature of the failure. In one embodiment, fast protection may be triggered when a PE failure is identified. The use of fast protection increases the likelihood that traffic is not lost in the event of a PE failure. Triggering fast protection may include efficiently triggering Ethernet Virtual Private Network (E-VPN) Border Gateway Protocol (BGP) prefix-independent convergence (PIC) functionality.

In one embodiment, a node in a network may distinguish between a PE failure and a ring partition or split ring failure upon receiving messages relating to a failure. By way of example, when a first PE obtains a ring automated protection switching (R-APS) message that indicates a signal failure from a node in a ring, and a message on a BGP Ethernet Segment (ES) route from a second PE which indicates that a failure has been detected, the first PE may identify a PE direct failure, and appropriate action may be taken to trigger fast protection.

Figure 1A:
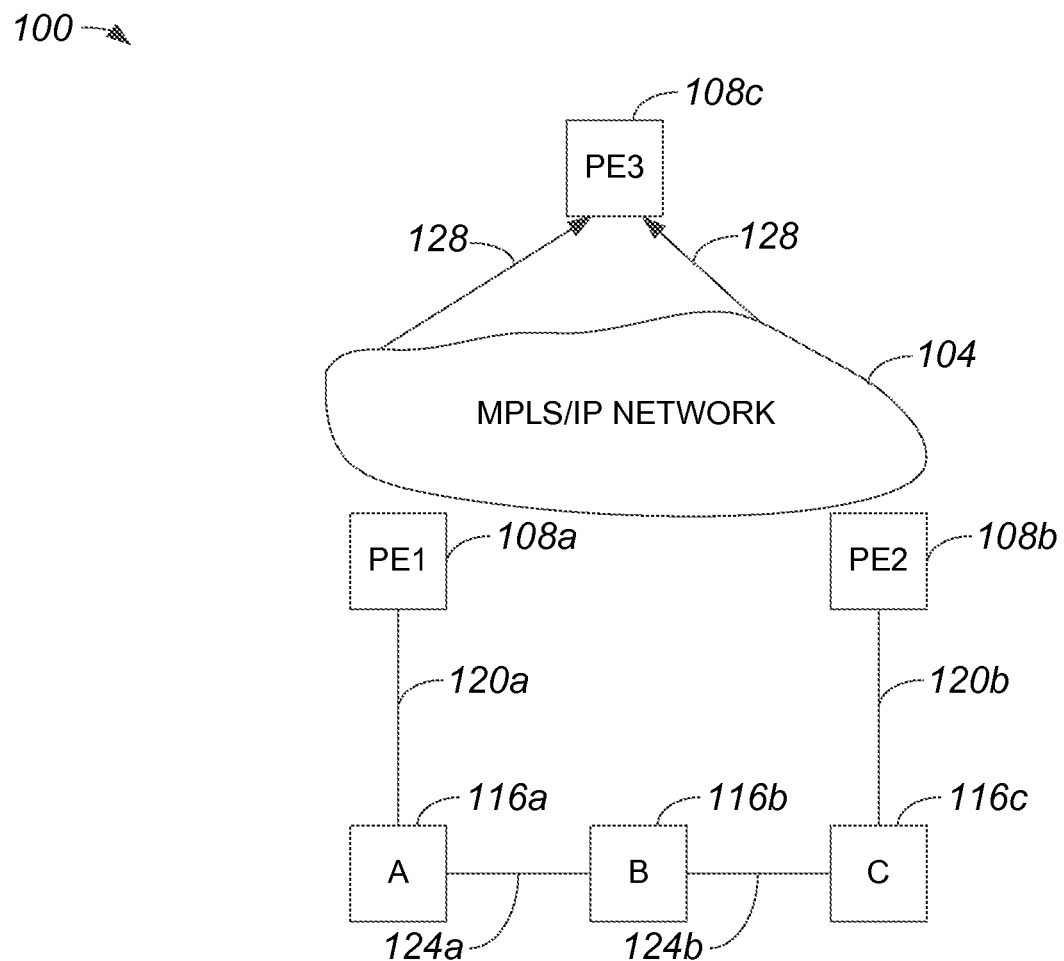
FIG. 1A is a diagrammatic representation of an overall network topology in which a G.8032 open ring terminates on two Ethernet Virtual Private Network (E-VPN) provider edges (PEs) in accordance with an embodiment.

Referring initially to FIG. 1A, an overall network topology in which a G.8032 open ring terminates on two E-VPN PEs will be described in accordance with an embodiment. An overall network 100 includes PEs 108a-c, or PE nodes, that are in communication over a Multiprotocol Label Switching (MPLS) or Internet Protocol (IP) network 104. A first PE 108a and a second PE 108b are E-VPN PEs on which a G.8032 open ring that includes nodes 116a-c terminates. A third PE 108c, which is a remote PE, is in the same E-VPN instances as nodes 116a-c on the open ring. Hosts or end-stations behind third PE 108c may be in communication with hosts or end-stations behind nodes 116a-c over certain E-VON instances. As will be appreciated by those skilled in the art, an E-VPN instance may include one or more VLANs used for communications.

Nodes 116a-c, which may be switches, are connected by links 124a, 124b. Node 116a is connected to first PE 108a by a link 120a, while node 116c is connected to second PE 108b by a link 120b. Third PE 108c learns of connectivity with a ring over MPLS/IP network 104 by receiving Ethernet A-D routes 128. In one embodiment, one Ethernet A-D route 128 associated with a ring is advertised by first PE 108a and another Ethernet A-D route 128 is advertised by second PE 108b.

Figure 1B:
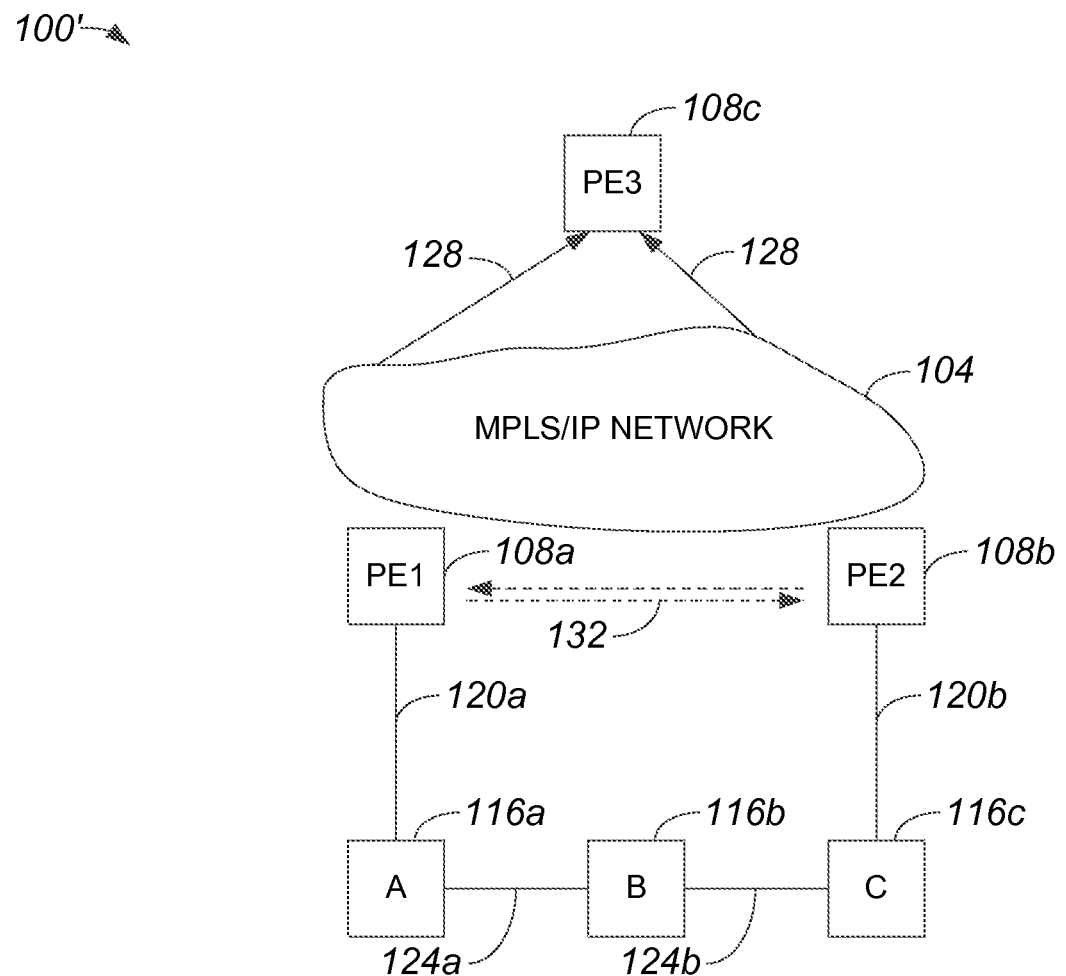
FIG. 1B is a diagrammatic representation of an overall network topology in which a G.8032 open ring terminates on two E-VPN PEs, e.g., overall network topology 100 of FIG. 1A, in which an Ethernet segment between the E-VPN PEs is shown in accordance with an embodiment.

As shown in FIG. 1B, first PE 108a and second PE 108b communicate with each other using E-VPN Ethernet Segment (ES) routes 132. Thus, information may be provided between first PE 108a and second PE 108b using ES 132 or using R-APS messages over the open ring, which includes nodes 116a-c.

A failure associated with a ring, as previously mentioned, may either be a PE direct failure or a ring partition failure. With respect to FIGS. 2-4, a PE direct failure will be described, and with respect to FIGS. 6 and 7, a ring partition failure or a split ring failure will be described.

Figure 2:
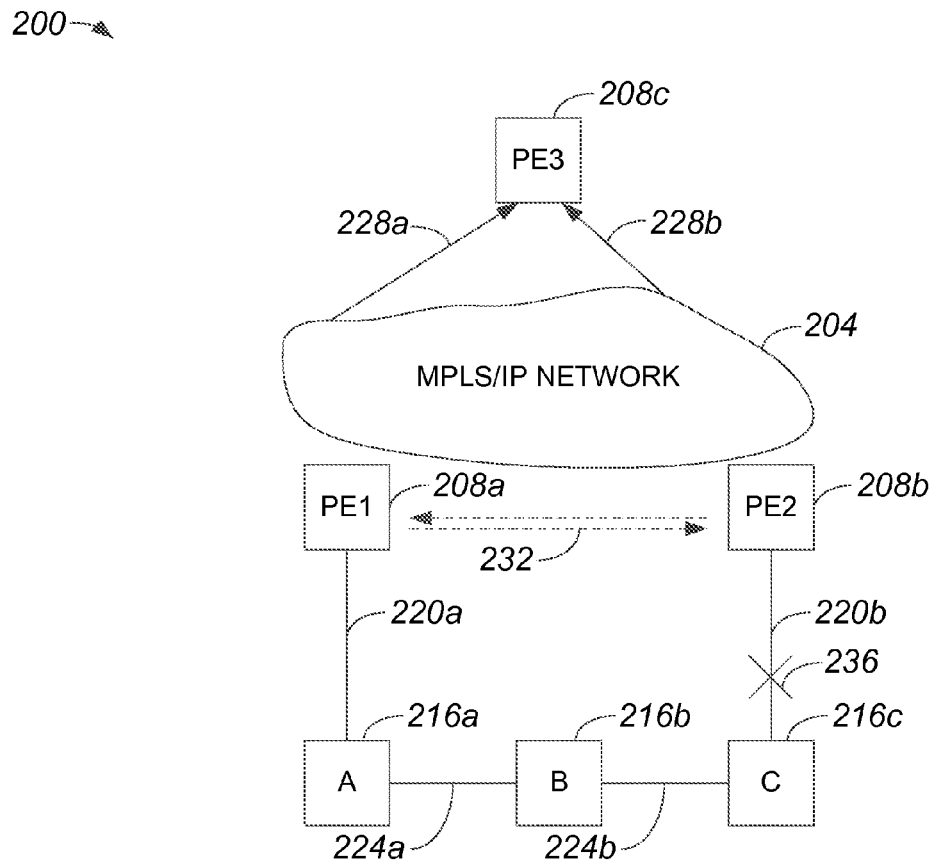
FIG. 2 is a diagrammatic representation of an overall network topology in which a G.8032 open ring terminates on two E-VPN PEs, and in which a PE direct failure has occurred in accordance with an embodiment.

FIG. 2 is a diagrammatic representation of an overall network topology in which a G.8032 open ring terminates on two E-VPN PEs, and in which a PE direct failure has occurred in accordance with an embodiment. Within an overall network 200, PEs 208a-c communicate with an MPLS or IP network. In the described embodiment, a first PE 208a is a backup PE to a second PE 208b, while a third PE 208c is a remote PE. First PE 208a and second PE 208b advertise Ethernet A-D routes 228a, 228b, respectively, associated with a ring Ethernet Segment to third PE 208c. An open ring that includes nodes 216a-c, link 220a, link 220b, link 224a, and link 224b terminates at first PE 208a and second PE 208b.

Because first PE 208a is a backup to second PE 208b, link 220a is initially blocked. As shown, a PE direct failure 236 has occurred. PE direct failure 236 may be a failure of link 220b or attachment circuit, a failure of a port of second PE 208b, and/or a failure of a port on switch 216c.

Figure 3:
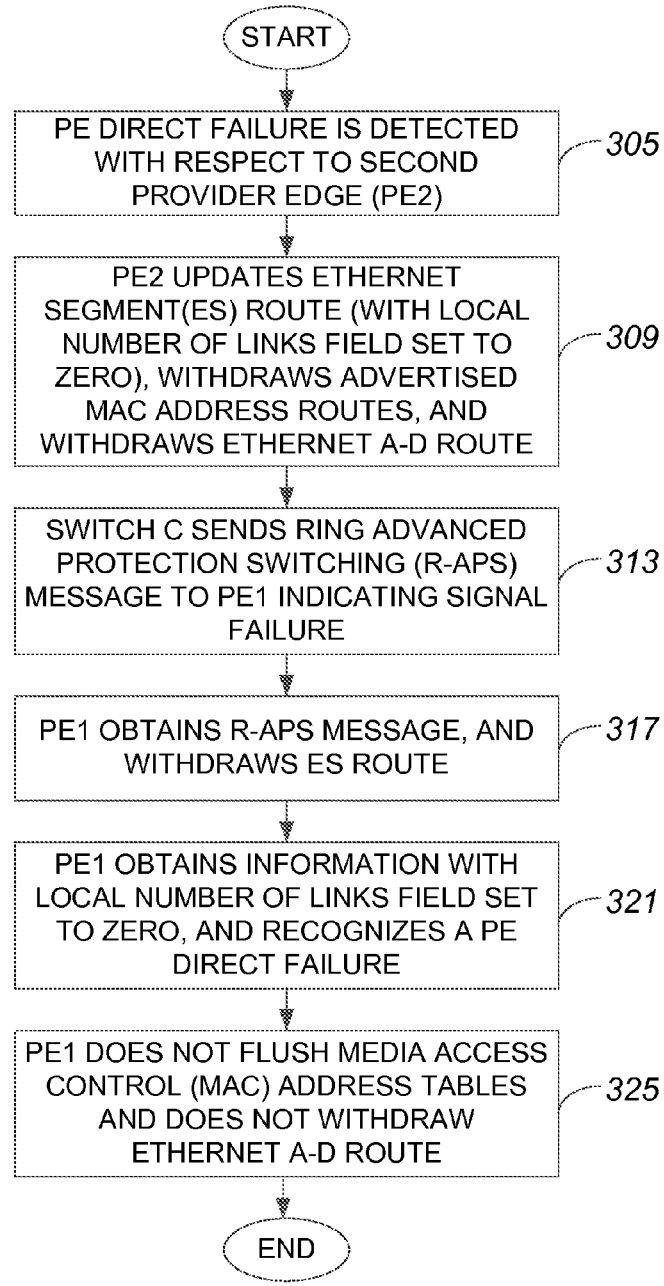
FIG. 3 is a process flow diagram which illustrates a method of processing a PE direct failure, e.g., a PE node failure or a PE attachment circuit failure in accordance with an embodiment.

Once PE direct failure 236 occurs, elements within overall network 200 may act to trigger protection actions to ensure that data, e.g., packets, may be transmitted throughout overall network 200. Referring next to FIG. 3, a method of processing a PE direct failure will be described in accordance with an embodiment. A method 301 of processing a PE direct failure being at step 305 in which a PE direct failure is detected with respect to a PE, e.g., second PE 208b of FIG. 2. For purposes of illustration, method 301 will be described in the context of overall network 200 of FIG. 2.

Once a PE direct failure is detected with respect to second PE 208b, second PE 208b updates an ES route in step 309. Updating an ES route, i.e., a BGP ES route, includes setting a Designated Forwarder (DF) election attribute carried in an ES route advertisement such that a "local number of links" field is set to zero. The DF election attribute may generally be sent towards second PE 208b through a BGP route-reflector (not shown). A DF election attribute will be discussed below with reference to FIG. 5. Setting the local number of links field in a DF election attribute to zero will effectively notify a recipient of the DF election attribute that a PE direct failure that relates to an open ring has been identified. In addition to updating the ES route, second PE 208b also withdraws its advertised Ethernet A-D route and may withdraw its advertised MAC advertisement routes. It should be appreciated that advertised MAC advertisement routes are withdrawn as entries age out in a forwarding database (FDB) associated with second PE 208b. When second PE 208b withdraws its Ethernet A-D route 228b, third PE 208c may begin to forward traffic to first PE 208a.

In step 313, node 216c, which may be a switch "C," identifies the existence of failure 236, and sends a R-APS message to first PE 208a indicating a signal failure. First PE 208a obtains the R-APS message sent by switch "C" through a ring port in step 317, and withdraws its ES route. Upon withdrawing its ES route, first PE 208a effectively awaits an indication as to whether the signal failure is a result of a PE direct failure or a split ring failure.

First PE 208a obtains information with a local number of links field set to zero in step 321. In the described embodiment, first PE 208a obtains a DF election attribute, i.e., the DF election attribute in which a local number of links field is set to zero in step 309, that is carried in an ES route advertisement. In the described embodiment, the information with the local number of links field set to zero is obtained from second PE 208b through a BGP route-reflector (not shown). Second PE 208b, upon obtaining the information with the local number of links field set to zero, is able to recognize a PE direct failure. That is, second PE 208b uses the R-APS message obtained from node 216c and the DF attribute obtained in an ES route advertisement from first PE 208a to determine that failure 236 is a PE direct failure.

It should be appreciated that although first PE 208a typically obtains an R-APS message prior to obtaining information with a local number of links field set to zero, the information with the local number of links field set to zero may instead be obtained first. That is, although it is more likely for an R-APS message to be received by first PE 208a before information with a local number of links field set to zero, the R-APS message is not necessarily received by first PE 208a before the information with the local number of links field set to zero is received.

From step 321, process flow moves to step 325 in which first PE 208a does not flush its MAC address tables, and does not withdraw its Ethernet A-D route 228a. In other words, first PE 208a effectively keeps Ethernet A-D route 228a, and the method of processing a PE direct failure is completed. Hence, traffic may be forwarded within network 200 through first PE 208a until failure 236 is resolved.

When a PE associated with a failure, e.g., a "failed PE," withdraws its Ethernet A-D route, substantially any remote PE that is affected by the withdrawal of the Ethernet A-D route may identify a backup PE to the failed PE and begin forwarding traffic to the backup PE. However, prior to traffic being forwarded to the backup PE, some traffic may be "in flight" from the remote PE to the failed PE. In order to avoid dropping or otherwise losing such in flight packets, local repair may effectively be implemented to enable in-flight packets to be provided to the backup PE. In one embodiment, local repair may be triggered upon the detection of a PE direct failure to provide protection action within a network.

Figure 4:
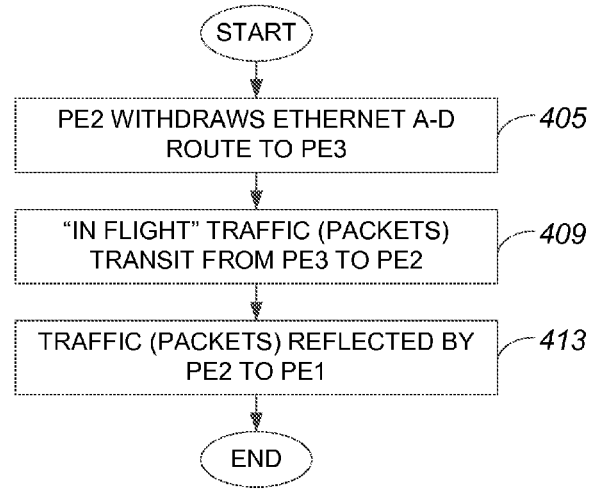
FIG. 4 is a process flow diagram which illustrates a method of performing a local repair in accordance with an embodiment.

A local repair method such as E-VPN BGP PIC optimization may be implemented to provide fast protection upon the identification of a PE direct failure. With reference to FIG. 4, one local repair method that allows traffic which is in flight to a failed PE to be forwarded once the failed PE withdraws its Ethernet A-D route will be described in accordance with an embodiment. A method 401 of providing local repair within a network that allows traffic to be forwarded through a backup PE begins in step 405 in which a failed PE withdraws its Ethernet A-D route to a remote PE. For ease of discussion, method 401 will be described with reference to FIG. 3. Therefore, in step 405, second PE 208b withdraws its Ethernet A-D route 228b to third PE 208c.

After second PE 208b withdraws Ethernet A-D route 228b, in flight traffic, e.g., packets, may be en route or in transit between third PE 208c and second PE 208b. In flight traffic transits from third PE 208c to second PE 208b in step 409, and the in-flight traffic is then reflected by second PE 208b to first PE 208a. As such, in flight traffic is not dropped or otherwise lost. Once in flight traffic is reflected by second PE 208b to first PE 208a, the method of providing local repair is completed.

Figure 5:
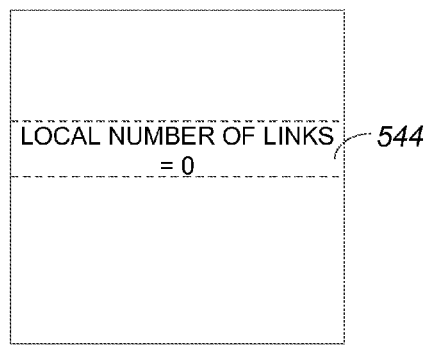
FIG. 5 is a block diagram representation of a Designated Forwarder (DF) Election Attribute carried in an Ethernet Segment (ES) route advertisement in accordance with an embodiment.

A PE that identifies a failure associated with a ring may generate an ES route advertisement which effectively indicates the failure has been identified. As previously mentioned, an indication that a failure has been identified may be provided in a DF Election Attribute carried in an ES route, or in an ES route advertisement. FIG. 5 is a block diagram representation of a DF Election Attribute carried in an ES route or in an ES route advertisement in accordance with an embodiment. A DF Election Attribute 540 generally provides information that facilitates the election of a DF. As shown, DF Election Attribute 540 includes a local number of links field 544. It should be appreciated that DF Election Attribute 540 generally also includes any number of additional fields including, but not limited to including, a state field, a flags field, and an IP address field. In the described embodiment, setting local number of links field 544 to a value of zero allows effectively updates an ES route to indicate a failure detected by a PE.

Figure 6:
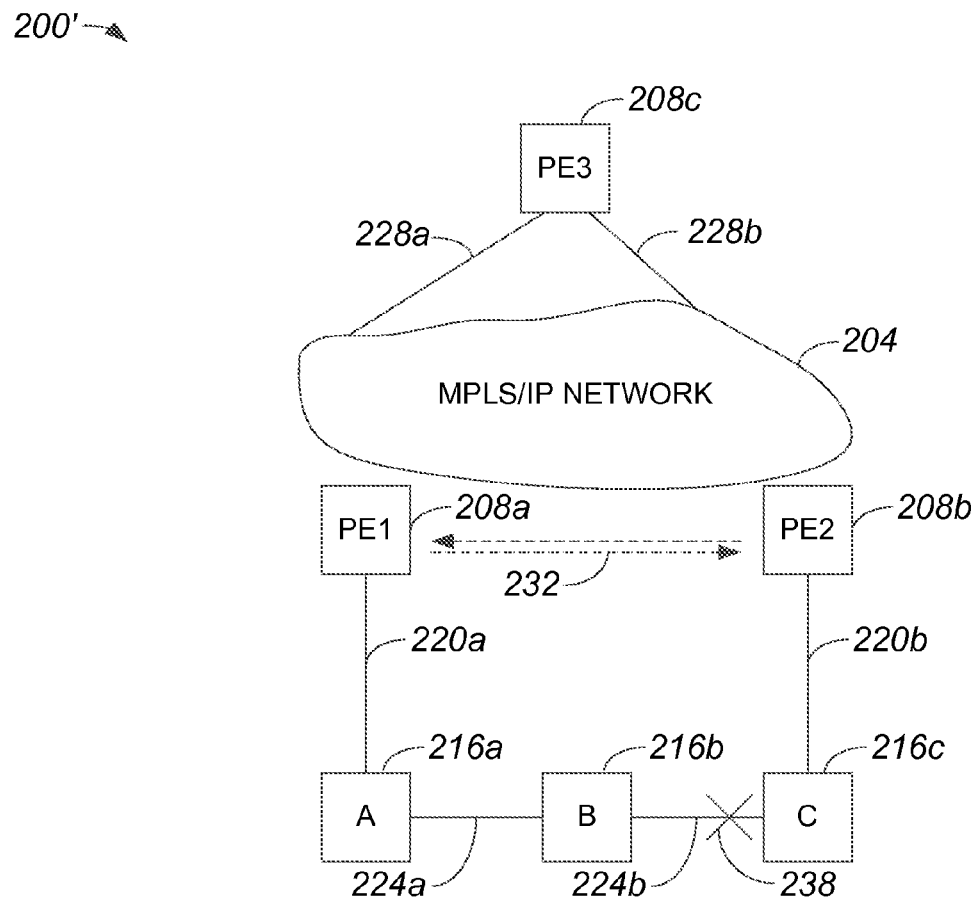
FIG. 6 is a diagrammatic representation of an overall network topology in which a G.8032 open ring terminates on two E-VPN PEs, e.g., overall network topology 200 of FIG. 2, in which a split ring failure has occurred in accordance with an embodiment.
Figure 7:
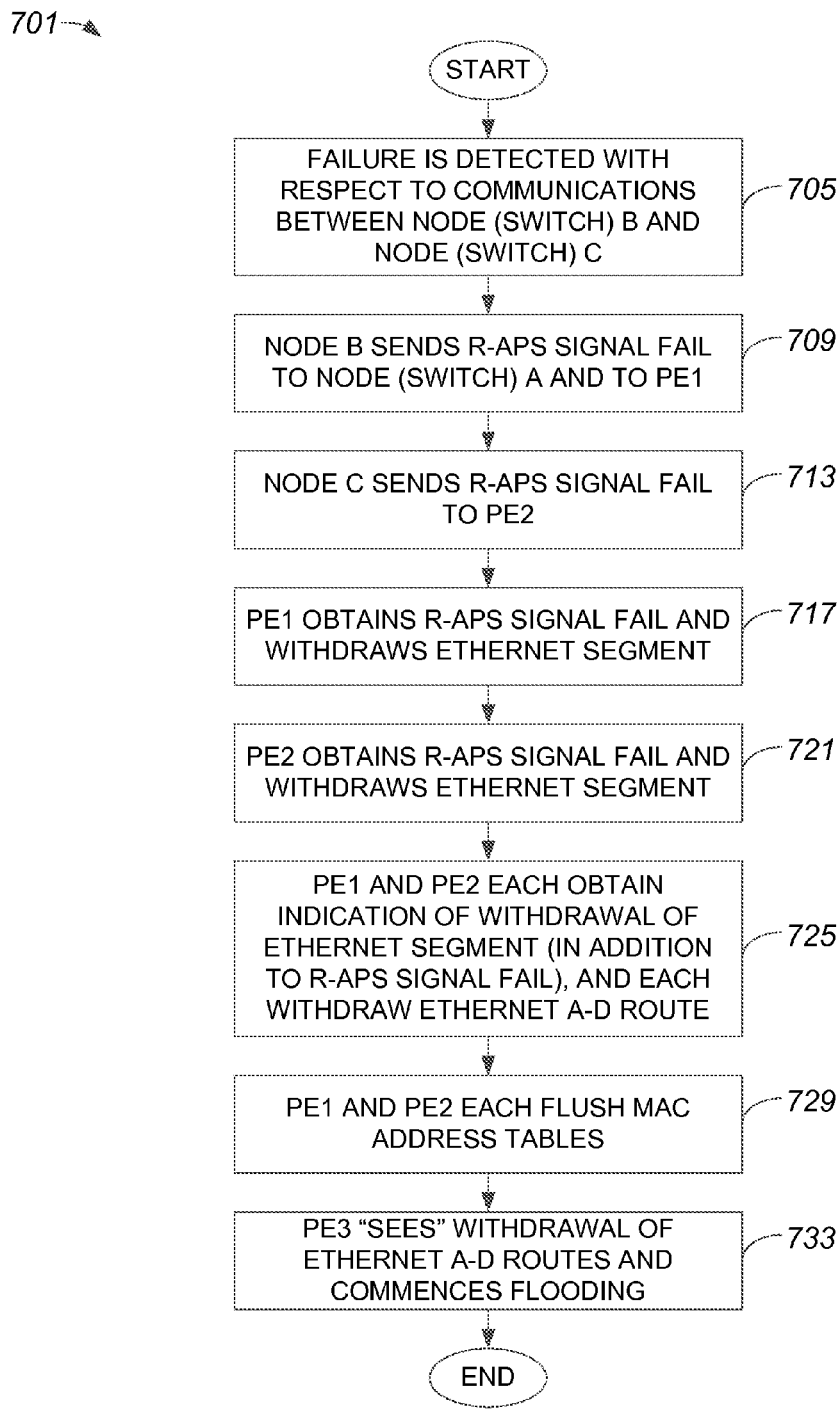
FIG. 7 is a process flow diagram which illustrates a method of processing a split ring failure in accordance with an embodiment.

With reference to FIGS. 6 and 7, a ring partition failure or a split ring failure will be described in accordance with an embodiment. A ring partition failure or a split ring failure is generally a failure that occurs in an open Ethernet ring, and the failure is not directly visible to PEs that terminate the ring. FIG. 6 is a diagrammatic representation of an overall network topology in which a G.8032 open ring terminates on two E-VPN PEs, e.g., overall network topology 200' of FIG. 2, in which a ring partition failure or a split ring failure has occurred in accordance with an embodiment. In overall network 200', a failure 238 is detected within a ring that includes nodes 216a-c. Failure 238 occurs in the ring such that traffic may not be forwarded between node 216b and node 216c. It should be appreciated that failure 238 may be a failure associated with node 216b, a failure associated with node 216c, and/or a failure on link 224b. In general, failure 238 causes the ring that includes nodes 216a-c to be partitioned or split.

FIG. 7 is a process flow diagram which illustrates a method of processing a ring failure, e.g., failure 238 of FIG. 6, in accordance with an embodiment. A method 701 of processing a ring failure begins at step 705 in which failure 238 is detected. As mentioned above, failure 238 may be associated with node 216b, node 216c, and/or link 224b. In general both node 216b and node 216c may detect failure 238.

Once failure 238 is detected, node 216b sends an R-APS signal fail message to node 216a and to first PE 208a in step 709. Node 216c sends an R-APS signal fail to second PE 208b in step 713.

In step 717, first PE 208a obtains the R-APS signal fail sent by node 216b, and withdraws its ES 232, i.e., its ES route associated with the ring including nodes 216a-c. It should be appreciated that first PE 208a generally obtains a R-APS signal fail over a ring port. Second PE 208b obtains the R-APS signal fail sent by node 216c and withdraws its ES 232 in step 721. It should be appreciated that step 717 and step 721 may occur in any order, and may also occur at substantially the same time.

First PE 208a and second PE 208b each obtain an indication relating to the withdrawal of an ES in step 725. First PE 208a obtains information regarding the withdrawal of ES 232 from second PE 208b, and second PE 208b obtains information regarding the withdrawal of ES 232 from first PE 208a. That is, first PE 208a detects that second PE 208b has withdrawn its ES 232 for the ring including nodes 216a-c, and second PE 208b detects that first PE 208b has withdrawn its ES 232 for the ring including nodes 216a-c. Thus, each PE 208a, 208b "sees" information relating to the withdrawal of ES 232 and an R-APS signal fail. As such, each first PE 208a withdraws its Ethernet A-D route 228a and second PE 208b withdraws its Ethernet A-D route 228b.

After Ethernet A-D routes 228a, 228b are withdrawn, first PE 208a and second PE 208b each flush their respective MAC tables in step 729. It should be appreciated that the respective MAC tables may, in some instances, be flushed prior to, or concurrent with, the withdrawal of Ethernet A-D routes 228a, 228b. In one embodiment, first PE 208a withdraws substantially all MAC routes advertised for its ES 232, and second PE 208b withdraws substantially all MAC routes advertised for its ES 232. It should be appreciated that newly learned MAC addresses would then be advertised with an Ethernet Segment Identifier (ESI) of zero, to indicate that there is no backup path.

In step 733, third PE 208c "sees" the withdrawal of Ethernet A-D routes 228a, 228b and commences flooding traffic. It should be appreciated that fast convergence is not triggered. In one embodiment, when first PE 208a and second PE 208b withdraw Ethernet A-D route 228a and Ethernet A-D route 228b, respectively, for the ring including nodes 216a-c, third PE 208c generally invalidates the next-hop adjacency for MAC routes learned from first PE 208a and second PE 208b. It should be appreciated that third PE 208b generally floods traffic until first PE 208a and second PE 208b learn end host reachability over the ring including nodes 216a-c and advertise associated MAC routes. The method of processing a ring failure is completed once flooding is commenced.

Figure 8:
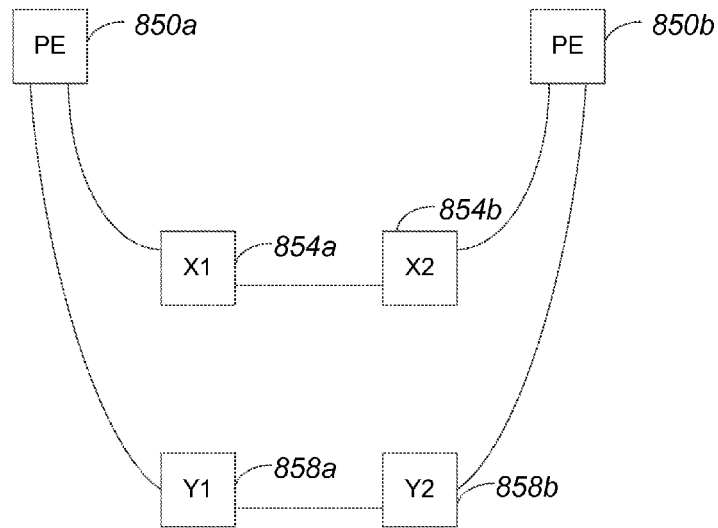
FIG. 8 is a diagrammatic representation of a network topology in which a plurality of G.8032 open rings terminates on the same two E-VPN PEs in accordance with an embodiment.

In some networks, more than one ring may terminate at the same endpoints. That is, more than one G.8032 open ring may exist between two particular PEs. FIG. 8 is a diagrammatic representation of a network topology in which a plurality of G.8032 open rings terminates on the same two E-VPN PEs in accordance with an embodiment. A first PE 850*a* and a second PE 850*b* are terminal points for a first open ring that includes nodes 854*a*, 854*b*. As will be appreciated by those skilled in the art, nodes 854*a*, 854*b* may be switches. First PE 850*a* and second PE 850*b* are also terminal points for a second open ring that includes nodes 858*a*, 858*b*. The first open ring and the second open ring are dual-homed to first PE 850*a* and second PE 850*b*.

When multiple open rings terminate at the same endpoints, e.g., PEs, an ESI which accommodates, or allows the substantially unique identification of, the open rings is needed to enable a failure associated with any of the open rings to be accurately identified. That is, in order to accommodate different access rings that are dual-homed to the same pair of PEs, information that uniquely identifies a particular access ring is included in an ESI for the particular access ring. In addition, an ESI for an open ring may be configured to account for multiple Ethernet Ring Protection (ERP) instances running on the ring.

Figure 9:
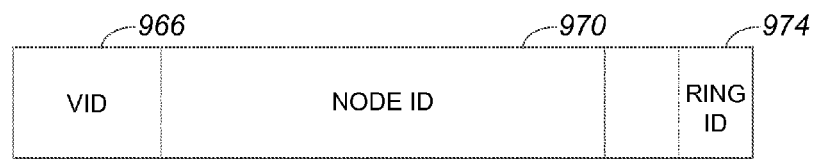
FIG. 9 is a diagrammatic representation of an Ethernet Segment Identifier (ESI) for a G.8032 ring in accordance with an embodiment.

Referring next to FIG. 9, an ESI for a G.8032 ring that substantially uniquely identifies the ring will be described in accordance with an embodiment. An ESI 962 for a G.8032 ring includes a first field 966 that includes a Virtual Local Area Network (VLAN) identifier (VID) 966 for an ERP instance of the G.8032 ring, a second field 970 that includes a node identifier (ID), and a third field 974 that includes a ring ID. ESI 962 may be of any suitable size, e.g., EID 962 may include approximately ten bytes.

In one embodiment, the VID contained in first field 966 is the VID of a base ERP instance of a given PE port that uniquely identifies the base ERP instance in the context of the G.8032 ring, e.g., a physical ring. It should be understood that a base ERP instance of a G.8032 ring may be the ERP instance on the ring with either the numerically lowest or numerically highest R-APS channel VLAN identifier, and either the numerically lowest or numerically highest ring identifier. As shown, VID contained in first field 966 may begin at a most significant bit of ESI 962, and may occupy approximately two bytes.

A node ID contained in second field 970 is a G.8032 node ID of a node, e.g., a switch, that sends an R-APS message over a base ERP instance on a given PE port. The node ID may map to a Ring Protection Link (RPL) owner node. It should be appreciated that the node ID is globally unique within an E-VPN network. In the described embodiment, field 970 includes approximately six bytes, and may be located at an offset of approximately two bytes from the most significant bit associated with ESI 962.

A ring ID contained in third field 974 is an ERP ring identifier of a base ERP instance on a given PE port. The ring ID is a value that uniquely identifies the ERP instance for interconnected rings when R-APS VIDs overlap across the rings. As will be appreciated by those skilled in the art, R-APS VIDs such as the VID contained in first field 966 may overlap when rings are interconnected. The ring ID allows ESI 962 which is associated with interconnected rings to substantially uniquely identify a ring. The size of third field 974 may generally be of any suitable size. For example, the size of third field 974 may be approximately one byte.

Figure 10:
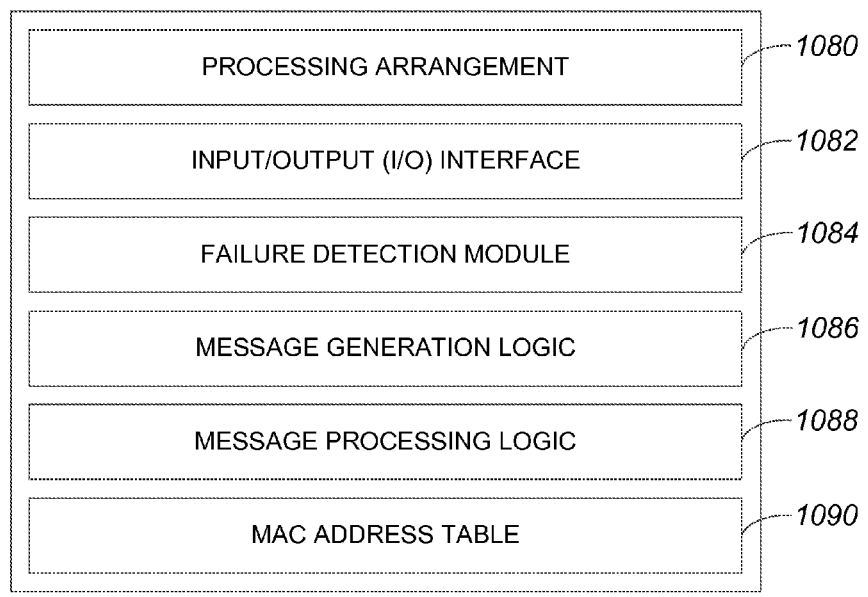
FIG. 10 is a block diagram representation of a network element or node, e.g., a PE or a switch, in accordance with an embodiment.

A network element that is suitable for distinguishing between a PE direct failure and a ring partition will be discussed with respect to FIG. 10. FIG. 10 is a block diagram representation of a network element or node, e.g., a PE or a switch, in accordance with an embodiment. A network element 1078 includes a processing arrangement 1080 and an input/output (I/O) interface 1082. Processing arrangement 1080 generally includes at least one processor, and is configured to cause logic associated with network element 1078 to execute. An I/O interface 1082 is arranged to obtain and to provide packets, e.g., traffic, with respect to a network. In other words, I/O interface 1082 may serve as an interface to either a wired or wireless network that enables network element 1078 to forward traffic and to receive traffic. I/O interface 1082 may include at least one I/O port such as a PE port (not shown) or a ring port (not shown). Ports (not shown) included in I/O interface 1082 typically include ports that allow communications within a ring and ports that allow communications with a PE.

A failure detection module 1084 includes hardware and/or software logic that allows network element 1078 to detect a failure associated with an open ring in a network. By way of example, failure detection module 1084 may detect whether there is an overall failure within a network.

Message generation logic 1086 is configured to generate a message that may be used to provide a notification that a failure has occurred. When network element 1078 is a switch that is part of a ring, message generation logic 1086 may generate an R-APS message that indicates the existence of a signal failure. When network element 1078 is a PE at which a ring terminates, message generation logic 1086 may generate and send messages which re-advertise an ES route and/or which indicate that an ES route or an Ethernet A-D route has been withdrawn.

Message processing logic 1088 is arranged to process obtained messages, e.g., messages received through I/O interface 1082, and to determine whether the messages indicate that a PE direct failure has occurred or whether the messages indicate that a split ring failure has occurred. For example, message processing logic 1088 is configured to determine when an R-APS signal fail message is received over a ring port and to determine when the R-APS signal fail message indicates that an ES route should be withdrawn. Message processing logic 1088 is also configured to cause MAC address tables to be flushed, when appropriate.

MAC address table 1090 is arranged to store MAC addresses. Typically, MAC address table 1090 provides information which identifies MAC addresses associated with particular ports (not shown) of I/O interface 1082.

Although only a few embodiments have been described in this disclosure, it should be understood that the disclosure may be embodied in many other specific forms without departing from the spirit or the scope of the present disclosure. By way of example, an ESI for a G.8032 ring has been described as being encoded such that a node ID is located at an offset of two bytes from a most significant bit. The node ID is not limited to being located at an offset of two bytes from a most significant bit. In general, the node ID is located at a predetermined offset such that the location of the node ID within an ESI is known to, and understood by, substantially all elements within a network.

In addition, an ESI for a G.8032 ring has been described as allowing multiple open rings which terminate on the same pair of PEs to be substantially uniquely identified. It should be appreciated that an ESI for a G.8032 ring, as described above, also accommodates the substantially unique identification of multiple sub-tended rings in a ladder configuration.

The embodiments may be implemented as hardware and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining a first indication from a first source, the first source being included in an Ethernet ring;
    obtaining a second indication associated with a provider edge (PE) node, wherein the second indication is associated with an Ethernet Segment (ES) route;
    processing the first indication and the second indication, wherein processing the first indication and the second indication includes determining when the first indication and the second indication are indicative of a direct failure of the PE node and determining when the first indication and the second indication are indicative of a ring partition failure associated with the Ethernet ring;
    identifying the direct failure of the PE node when it is determined that the first indication and the second indication are indicative of the direct failure of the PE node; and
    identifying the ring partition failure associated with the Ethernet ring when it is determined that the first indication and the second indication are indicative of the ring partition failure associated with the Ethernet ring.

2. The method of claim 1 wherein the first indication is a Ring Advanced Protection Switching (R-APS) signal fail message and the second indication is a Designated Forwarder (DF) election attribute with a local number of links field arranged to indicate a direct failure of the PE node, wherein the DF election attribute is obtained on the ES route.

3. The method of claim 2 wherein when it is determined that the first indication and the second indication are indicative of the direct failure of the PE node, the method further includes:
    implementing a Ethernet Virtual Private Network (E-VPN) Border Gateway Protocol (BGP) prefix-independent convergence (PIC) optimization, wherein the E-VPN BGP PIC optimization is configured to prevent a particular Ethernet A-D route from being withdrawn.

4. The method of claim 1 wherein the ES route is a first ES route associated with the Ethernet ring, and wherein the first indication is a Ring Automated Protection Switching (R-APS) signal fail message and the second indication is a notification that the first ES route has been withdrawn by the PE node.

5. The method of claim 4 further including:
    withdrawing a second ES route associated with the Ethernet ring in response to obtaining the R-APS signal fail message.

6. The method of claim 5 further including:
    withdrawing an Ethernet A-D route for the Ethernet ring when an R-APS signal fail message is obtained and when the notification that the first ES route has been withdrawn is obtained; and
    withdrawing Media Access Control (MAC) routes for the second ES route.

7. The method of claim 1 wherein the Ethernet ring is a G0.8032 open ring, and wherein an Ethernet Segment Identifier (ESI) that identifies the G0.8032 open ring includes a node identifier (ID) at a fixed location from a most significant bit of the ESI, the node ID being arranged to uniquely identify an owner of the G0.8032 open ring that sends R-APS messages over a base Ethernet Ring Protection (ERP) instance.

8. A tangible, non-transitory computer-readable medium comprising computer program code, the computer program code, when executed, configured to:
    obtain a first indication from a first source, the first source being included in an Ethernet ring;
    obtain a second indication associated with a provider edge (PE) node, wherein the second indication is associated with an Ethernet Segment (ES) route;
    process the first indication and the second indication, wherein the computer program code configured to process the first indication and the second indication is configured to determine when the first indication and the second indication are indicative of a direct failure of the PE node and to determine when the first indication and the second indication are indicative of a ring partition failure associated with the Ethernet ring;
    identify the direct failure of the PE node when it is determined that the first indication and the second indication are indicative of the direct failure of the PE node; and
    identify the ring partition failure associated with the Ethernet ring when it is determined that the first indication and the second indication are indicative of the ring partition failure associated with the Ethernet ring.

9. The tangible, non-transitory computer-readable medium comprising computer program code of claim 8 wherein the first indication is a Ring Automated Protection Switching (R-APS) signal fail message and the second indication is a Designated Forwarder (DF) election attribute with a local number of links field arranged to indicate a direct failure of the PE node, wherein the DF election attribute is obtained on the ES route.

10. The tangible, non-transitory computer-readable medium comprising computer program code of claim 9 wherein when it is determined that the first indication and the second indication are indicative of the direct failure of the PE node, the computer program code is further configured to:
    implement a Ethernet Virtual Private Network (E-VPN) Border Gateway Protocol (BGP) prefix-independent convergence (PIC) optimization, wherein the E-VPN BGP PIC optimization is configured to prevent a particular Ethernet A-D route from being withdrawn.

11. The tangible, non-transitory computer-readable medium comprising computer program code of claim 8 wherein the ES route is a first ES route associated with the Ethernet ring, and wherein the first indication is a Ring Advanced Protection Switching (R-APS) signal fail message and the second indication is a notification that the first ES route has been withdrawn by the PE node.

12. The tangible, non-transitory computer-readable medium comprising computer program code of claim 11 wherein the computer program code is further configured to withdraw a second ES route associated with the Ethernet ring in response to obtaining the R-APS signal fail message.

13. The tangible, non-transitory computer-readable medium comprising computer program code of claim 12 wherein the computer program code is further configured to:
  withdraw an Ethernet A-D route for the Ethernet ring; and
  withdraw Media Access Control (MAC) routes for the second ES route.

14. The tangible, non-transitory computer-readable medium comprising computer program code of claim 8 wherein the Ethernet ring is a G.8032 open ring, and wherein an Ethernet Segment Identifier (ESI) that identifies the G.8032 open ring includes a node identifier (ID) at a fixed location from a most significant bit of the ESI, the node ID being arranged to uniquely identify a component of the G.8032 open ring that sends R-APS messages over a base Ethernet Ring Protection (ERP) instance.

15. An apparatus comprising:
  means for obtaining a first indication from a first source, the first source being included in an Ethernet ring;
  means for obtaining a second indication associated with a provider edge (PE) node, wherein the second indication is associated with an Ethernet Segment (ES) route;
  means for processing the first indication and the second indication, wherein the means for processing the first indication and the second indication include means for determining when the first indication and the second indication are indicative of a direct failure of the PE node and means for determining when the first indication and the second indication are indicative of a ring partition failure associated with the Ethernet ring;
  means for identifying the direct failure of the PE node when it is determined that the first indication and the second indication are indicative of the direct failure of the PE node; and
  means for identifying the ring partition failure associated with the Ethernet ring when it is determined that the first indication and the second indication are indicative of the ring partition failure associated with the Ethernet ring.

16. An apparatus comprising:
  an input/output (I/O) interface, the I/O interface configured to support network communications associated with an Ethernet ring and with an Ethernet Segment (ES) route;
  logic, the logic configured to obtain a first indication from the Ethernet ring and a second indication, the second indication being associated with the ES route, the logic further configured to process the first indication and the second indication to determine when the first indication and the second indication are indicative of a direct failure of a provider edge (PE) node and when the first indication and the second indication are indicative of a ring partition failure associated with the Ethernet ring, the logic further configured to identify the direct failure of the PE node when it is determined that the first indication and the second indication are indicative of the direct failure of the PE node, and the logic further configured to identify the ring partition failure associated with the Ethernet ring when it is determined that the first indication and the second indication are indicative of the ring partition failure associated with the Ethernet ring; and
  a processor configured to execute the logic.

17. The apparatus of claim 16 wherein the logic is still further configured to identify the direct failure of the PE node and to implement a Ethernet Virtual Private Network (E-VPN) Border Gateway Protocol (BGP) prefix-independent convergence (PIC) optimization when it is determined that the first indication and the second indication are indicative of the direct failure of the PE node.

18. The apparatus of claim 16 wherein the ES route is a first ES route associated with the Ethernet ring, and wherein the first indication is a Ring Advanced Protection Switching (R-APS) signal fail message and the second indication is a notification that the first ES route has been withdrawn by the PE node 19. The apparatus of claim 18 wherein the logic is still further configured to withdraw a second ES route associated with the Ethernet ring in response to obtaining the R-APS signal fail message, wherein the notification that the first ES route has been withdrawn by the PE node is obtained after the second ES route is withdrawn.

20. The apparatus of claim 19 wherein the logic is still further configured to withdraw an Ethernet A-D route for the Ethernet ring and to withdraw Media Access Control (MAC) routes for the second ES route.

21. The apparatus of claim 16 wherein the first indication is a Ring Advanced Protection Switching (R-APS) signal fail message and the second indication is a Designated Forwarder (DF) election attribute with a local number of links field arranged to indicate a direct failure of the PE node, wherein the DF election attribute is obtained on the ES route.

22. The apparatus of claim 16 wherein the Ethernet ring is a G.8032 open ring, and wherein an Ethernet Segment Identifier (ESI) that identifies the G.8032 open ring includes a node identifier (ID) at a fixed location from a most significant bit of the ESI, the node ID being arranged to uniquely identify a component of the G.8032 open ring that sends R-APS messages over a base Ethernet Ring Protection (ERP) instance.

* * * * *